United States Patent [19]

Zimdars

[11] Patent Number: 4,902,025
[45] Date of Patent: Feb. 20, 1990

[54] SELF-CLAMPING OR SELF-TIGHTENING CHUCK

[75] Inventor: Arno W. Zimdars, Ostfildern, Fed. Rep. of Germany

[73] Assignee: Joseph Albrecht, Bohrfutterfabrik GmbH & Co., Esslingen, Fed. Rep. of Germany

[21] Appl. No.: 268,510

[22] Filed: Nov. 8, 1988

[30] Foreign Application Priority Data

Dec. 31, 1987 [DE] Fed. Rep. of Germany ....... 3744589

[51] Int. Cl.$^4$ .............................................. B23B 31/04
[52] U.S. Cl. .......................................... 279/64; 279/60
[58] Field of Search ................... 279/1 B, 1 K, 57, 56, 279/58, 59, 60, 63, 64, 65, 71

[56] References Cited

U.S. PATENT DOCUMENTS

| 1,705,275 | 3/1929 | von Neudeck | 279/64 |
| 4,695,065 | 9/1987 | Komatsu et al. | 279/60 |

FOREIGN PATENT DOCUMENTS

| 0017748 | 12/1981 | European Pat. Off. | |
| 819612 | 9/1951 | Fed. Rep. of Germany | 279/56 |
| 201985 | 8/1983 | German Democratic Rep. | |
| WO86/03149 | 6/1986 | PCT Int'l Appl. | |
| 90455 | 11/1937 | Sweden | 279/58 |
| 634766 | 4/1983 | Switzerland | |

Primary Examiner—Gil Weidenfeld
Assistant Examiner—Daniel W. Howell
Attorney, Agent, or Firm—Frishauf, Holtz, Goodman & Woodward

[57] ABSTRACT

To provide for an axially short self-tightening chuck, a spiral spring (22) is located inside the chuck to couple together a cylindrical surface (24) formed on the chuck spindle, for example on an extending flange (17) thereof and a cylindrical surface (25) on an axial extension (16) of a holding sleeve which retains the chucking mechanism, including clamping jaws (9) and the like. An operating ring (23) is engageable with an end portion of the spring. The spring has a direction of winding which, with a given direction of rotation of the tool, tightens the spring about the axially adjacent surfaces (24, 25) on the chuck body and the holding sleeve, so that they will rotate together, and, even under conditions of vibrations or sudden stopping, not loosen, since relative reverse rotation is inhibited by frictional engagement of the spiral spring between the parts. To release the chuck, an operating ring (23) is engageable with an end portion (27) of the spring, so that the spring can be mechanically released from the frictional engagement with the adjacent surfaces.

13 Claims, 4 Drawing Sheets
SELF-CLAMPING OR SELF-TIGHTENING CHUCK

The present invention relates to a chuck, and more particularly to a chuck which can be manually tightened and, once tightened, will remain tight or increase the tightness during operation, but which can be readily released and which, further, is of compact, or short axial length construction.

BACKGROUND

Chucks usually have a cylindrical base body into which a back-up spindle or the like is screwed. Clamping or holding jaws are axially supported on the back-up spindle, and retained in position by a holding sleeve or the like which surrounds the jaws. Preferably, the holding sleeve includes an essentially cylindrical sleeve element. The holding sleeve and/or the sleeve element are rotatable with respect to the base body. It is known to place between the sleeve and the base body a releasable locking arrangement. The locking arrangement locks when the sleeve is rotated in one direction, and can be unlocked, to release the clamping jaws, when rotated in the opposite direction.

Chucks which operate at high speed, that is, at high revolution of the spindle, which is typical for computer numerically controlled machines, may cause release of the lock, and hence release of the clamping jaws which clamp a tool, such as a drill, a boring tool, a reamer or the like. This may occur, particularly, if the machine is operating at high speed and then abruptly stopped. To prevent such loosening of the locking of the clamping jaws, and hence of the tool upon sudden stopping, a locking arrangement has been proposed to be placed between the base body and the sleeve in form of a ratchet which secures the base body and the sleeve with respect to relative movement in the direction of loosening of the clamping jaws. Of course, the ratchet is so arranged that the tool, and hence the clamping jaws can be tightened; relative rotation in the direction of tightening is not impeded. The selfretaining clamping function of the chuck, upon rotation in working direction, thus is retained. Such an arrangement is described, for example, in the referenced European Published Application No. 0017 748. The arrangement there described utilizes a pressure ring which is secured to rotate with the sleeve and which is axially supported on the base body by the sleeve itself. A spring-loaded ratchet latch is located on the ring which is directly operatively coupled to a gear ring located on the base body. In order to be able to open the jaws, for example in order to change tools or the like, an arrangement is provided to open the latch of the ratchet. This opening arrangement includes a rotatable release ring located at the axially backward end of the sleeve and positioned coaxially to the axis of rotation, and fitting over the ring. The opening release ring has a stop engageable with a suitable end release projection on the latch elements of the ratchet.

Swiss Patent No. 635,766 describes a jaw chuck which also has a circular ratchet ring and, generally, operates similarly to the chuck just described.

A ratchet lock, with a movable ratchet latch element, or a plurality of movable ratchet elements is comparatively complex and large; it requires a not insignificant space on the chuck structure. Due to the nature of the ratchet, it can operate only in steps. Consequently, the locking of the clamping force or effect of the jaws can be obtained only in steps. This is undesirable for many applications. The spacing of the steps is governed by the spacing of the teeth on the gear ring, and the construction of the ratchet, and the latch elements themselves.

German Democratic Republic Patent No. DD-PS 201 985 describes an axially short clamping chuck which has a clamping effect independent of the direction of rotation. The base body which receives the back-up spindle is rotatably located in a conical element which is directly screw-connected to a closing cap. To tighten and, respectively, loosen the clamping jaws, a worm drive is provided between the base body and the conical element to permit relative rotation thereof. The worm can be operated by an Allen wrench externally engageable in a suitable receiving portion of the worm arrangement.

The worm arrangement, however, loses the advantage of a self-tightening function of the rotating chuck. It is inconvenient to require an external separate tool in order to permit tightening of the chuck.

THE INVENTION.

It is an object to provide a self-tightening chuck which has an axially short length, and permits operation by hand, that is, without external tools and which reliably clamps or tightens jaws about a tool body, without permitting loosening even under abrupt stopping or otherwise difficult working conditions and without operating in steps.

Briefly, a locking arrangement is provided which, in accordance with the invention, includes a surrounding spring coaxially located with respect to the base body, and coupling together axially adjacent coaxial rotation-symmetrical regions of the base body and the tightening sleeve, or parts or elements coupled to the tightening sleeve or the base body. A selectively operating release mechanism is likewise provided, operatively associated with the, preferably spiral, spring to permit release of the coupling engagement when desired.

The arrangement has the advantage that the spring, forming a surrounding or encompassing spring coupling, results in a reliable construction which is self-tightening, infinitely variable, or engageable with respect to the circumferential positions and axially of small size. Stepless operation and clamping is ensured. The spring, due to its construction, permits relative movement between the sleeve which engages the jaws, or any element coupled thereto, and the base body or, respectively, the back-up spindle in one direction of rotation only, namely in the direction of clamping of the jaws on a tool or the like. Thus, the chuck, during drilling, boring or the like, can retighten itself automatically; relative rotation, however, between the sleeve and the base body in the opposite direction is reliably impeded by frictional engagement of the parts surrounded by and engaged by the spring, which typically is a spiral wrap-around spring.

In accordance with a feature of the invention, the spiral spring is located within the holding sleeve structure itself, which results in a particularly simple and compact construction. The spiral surrounds a region of the back-up spindle, for example a cylindrical flange formed thereon. The regions or zones surrounded by the spiral spring, preferably are cylindrical and formed with smooth coaxial outer surfaces of the same diameter. It is not necessary, however, that these regions are symmetrical; they may be conical, for example, in which case the surrounding spring then must be formed or shaped to match the surfaces which it is to engage.

To release the jaws, a selectively operable coupling control ring is provided which, in accordance with a feature of the invention, is formed as an operating ring and relatively rotatable with respect to the holding sleeve. The operating ring can be directly rotatably located on the sleeve. It is formed with regions engageable with and operatively coupled to the spiral spring. Preferably, the inner surface of the operating ring is shaped to cooperate with the spring by engaging the spring and permitting rotation thereof, manually, by engagement with the operating ring. The operating ring, thus, will fit over and completely cover the spring, thus providing protection therefor. The release means for the spring may be a cam track formed on the ring, and the spring can be carried through an opening in the sleeve to form an end portion thereof which will be brought in engagement with the operating ring. The opening in the sleeve again is covered by the operating ring. This reliably prevents contamination by dirt, coagulated oil or the like, and ensures cleanliness of the internal elements of the chuck. The end portion of the spring, preferably, is bent or offset. The operating ring is formed with engagement or abutment regions so that the angle of rotation through which the operating ring can be turned is defined and limited.

DRAWINGS, illustrating an example of the invention:

DETAILED DESCRIPTION.

Figure 1:
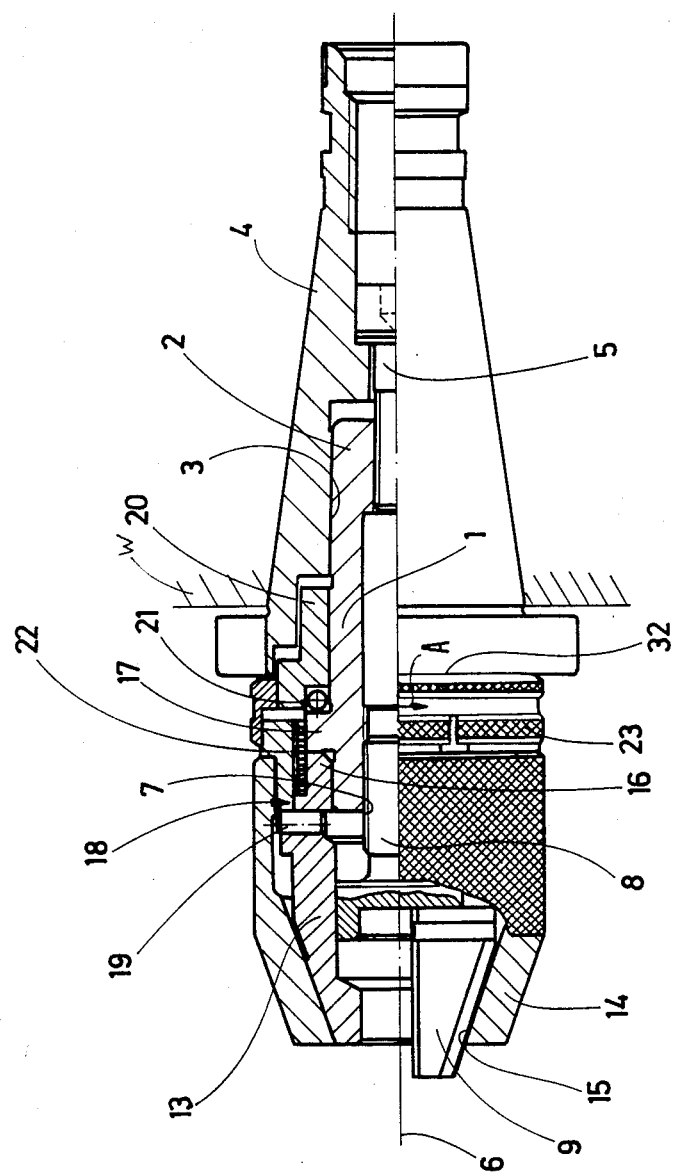
FIG. 1 is a side view, partly cut away and in section, illustrating the chuck in accordance with the present invention.
Figure 2:
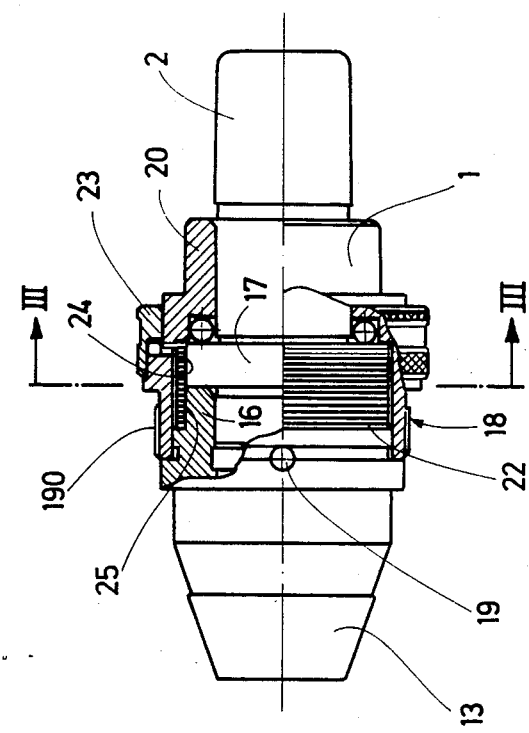
FIG. 2 is a side view, partly cut away and in section, of the base body, the sleeve, and the carrier for the jaws with the spring, that is, illustrating the forward portion of the chuck element to an enlarged scale and showing more detail.

The self-tightening or self-clamping chuck has an essentially cylindrical base body 1 which, with a suitable taper end 2, can be fitted into a coaxial bore 5 of a tool holder 4 with a tapered opening. The base body 1 is secured to the holder 4 by a screw 5, with a recessed hexagonal end, for example to receive a socket wrench or Allen wrench. The chuck rotates about its longitudinal axis 6. The base body 1 is formed with a coaxial threaded bore 7, in which a back-up spindle 8 is secured. The back-up spindle 8 backs up, and axially supports clamping jaws 9. Only one clamping jaw is shown in FIGS. 1 and 2 for simplicity and for better illustration in the drawing. Usually, three or more clamping jaws are used. The clamping jaw above the line of symmetry in the sectional view of FIG. 1 has been omitted for clarity of representation.

The clamping jaws 9 have slide engagements 10 at their ends and are guided in slide guides 11 for fixed rotation, but radial shifting with respect to the back-up spindle 8. The clamping jaws 9 are guided in guide grooves 12 (FIG. 4) of a holding sleeve 13. The holding sleeve 13 is surrounded by an outer closing sleeve 14. The outer closing sleeve 14 has an inner conical surface 15 (FIG. 1) which, as well known, operatively engages the clamping jaws 9 and radially engages the clamping jaws.

The holding sleeve 13 has an inner cylindrical extension 16. The inner cylindrical extension 16 is also inwardly cylindrical and rotatable with respect to the base body 1. It is axially supported in position against the base body by a flange 17. A sleeve 18, coaxial to the base body is fitted over a portion of the holding sleeve 13 with a close fit. The holding sleeve 13 and the coaxial sleeve 18 are connected together by a pin 19 so that they will rotate together. The coaxial sleeve 18 is formed with an outer thread 190 (FIGS. 2, 4), on which the outer or closing sleeve 14 is screwed. Roll-off elements 21 are located between the flange 17 and a sleeve element 20. The rolling elements 21, for example bearing balls, permit rotation of the sleeve portion 20 of the coaxial sleeve 18. The bearing balls 21, in cooperation with the opposite ring surface of the flange 17, support the coaxial sleeve 18 and the holding sleeve 19 on the base body 1 in axial direction, such that the flange 17 is axially retained between the holding sleeve 13 and the coaxial sleeve 18. A releasable clamping arrangement is located between the base body 1 and the sleeve 18, or the holding sleeve 13, respectively, which permits relative rotation between the coaxial sleeve 18 and the base body 1 in clamping direction but, in opposite direction, that is, in the direction of loosening of the clamping effect of the jaws 9, locks the clamping jaws 9 in position.

In accordance with the present invention, the locking arrangement is a spring clutch, formed as a surrounding or encompassing spring which, in accordance with a feature of the invention, includes a spiral spring 22 positioned coaxially with respect to the base body 1 and which is coupled to a selectively operating unlocking or coupling control element 23 which is rotatably located on the coaxial sleeve 18.

Figure 3:
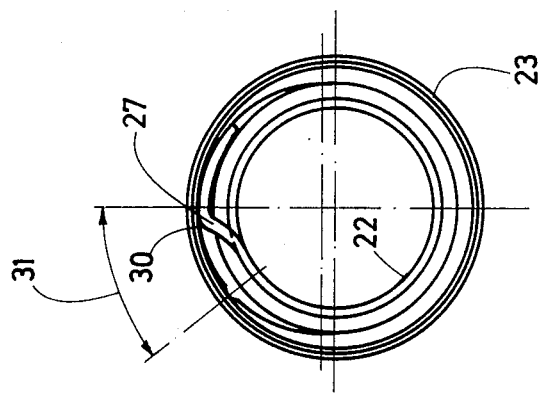
FIG. 3 is a sectional view along line III—III of FIG. 2.
Figure 4:
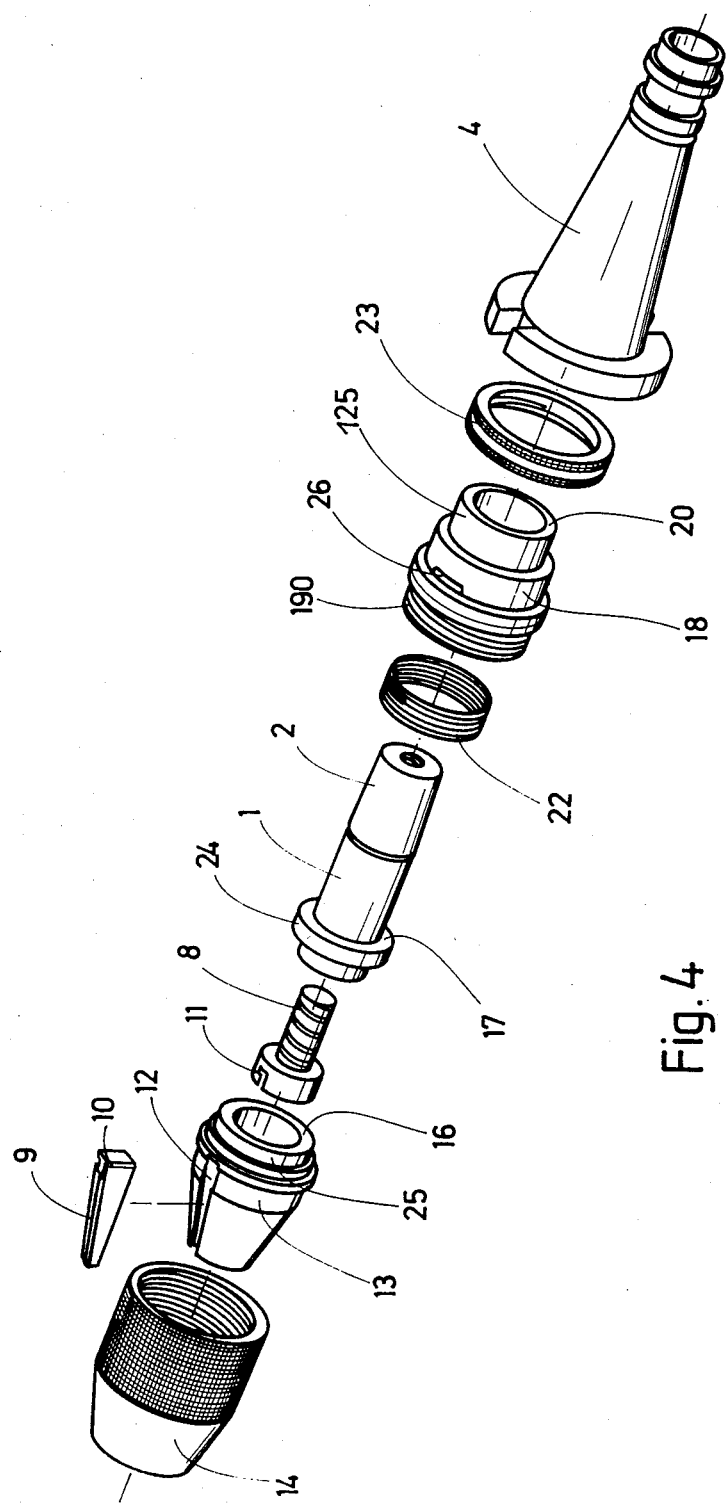
FIG. 4 is an exploded, perspective view of the chuck.
Figure 6:
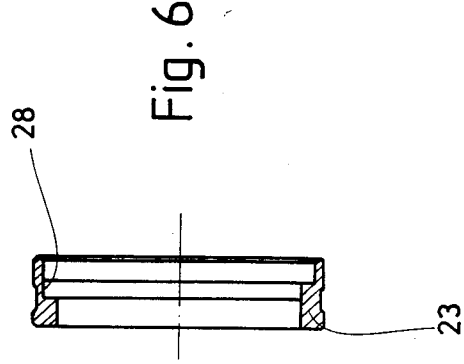
FIG. 6 is a section along line VI—VI of FIG. 5.

The spring 22, as best seen in FIGS. 1, 2 and 4, surrounds the cylindrical, entirely smooth outer surface 24 of the flange 17, and further the also completely smooth set-back surface 25 on the cylindrical extension 16 of the holding sleeve 13, which supports and holds the jaws 9. The two cylindrical surface 24, 25, see FIG. 2, are located immediately adjacent each other. The two surfaces 24, 25 have the same diameter, surface 25 being offset or reduced with respect to the remainder of the holding sleeve 13. As clearly appears from FIG. 2, the surrounding spring 22 is located within the sleeve 18, which completely surrounds the holding spring. The coaxial sleeve 18 is formed with an opening 26 extending axially therefrom in form of a slit (see FIG. 4) through which a bent-off end portion 27 (see FIG. 3) of the spring 22 is carried outwardly. The opening 26 is so positioned that it can be placed within an operating or operating control ring 23, which externally covers the opening 26.

Figure 5:
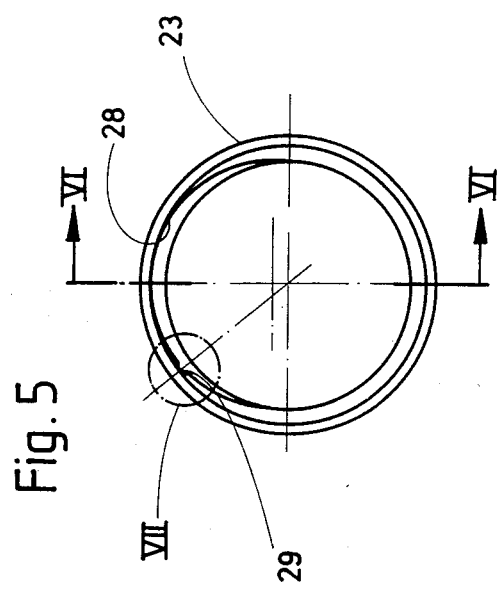
FIG. 5 is a top view of the release operating ring.
Figure 7:
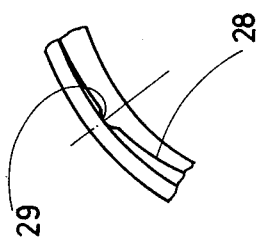
FIG. 7 is a fragmentary view to an enlarged scale of the zone within the circle VII of FIG. 5.

The operating ring 23 has internal release elements which cooperate with the bent-off end portion 26 of the spring 22. These release elements are formed as an eccentric cam track 28 (see FIGS. 5 and 7). When the clutch is coupled together, the spring 22 with its bent-off end portion 27 will be positioned at the level of the cam track 28 (see FIG. 3). On one side, the cam track 28 is formed with a groove-like recess 29 (FIG. 7) which, in a "closed" position of the operating ring 23, permits the bent-off end portion 27 of the spring 22 to engage therein with a shoulder 30. The shoulder 30, together with the groove or depression 29, forms an abutment stop which limits the angle of rotation of the operating ring 23 on the sleeve 18 to an angle shown in FIG. 3 at 31 in one direction. The limitation of the angular range 31 to the other side is given by the clamping effect formed by the bent-off end portion 27 of the spring 22 which engages, for example at the region 30 (FIG. 3), between the wedge-like inwardly directed cam track 28 (FIG. 5) and the cylindrical surface 24 of the flange 17, and thus prevents further rotation of the operating ring 23. Externally applied markets or stops, one of which is shown schematically at FIG. 1, can indicate, respectively, an "open" and "closed" position of the operating ring 23. An arrow pointing to for example the "open" direction can be placed on the ring 23, as shown by arrow A (FIG. 1).

In the "closed" position of the operating ring 23, the coaxial sleeve 18 together with the holding sleeve 13 and the outer closing sleeve 14, can be rotated in the direction of tightening the jaws 9 of the chuck freely with respect to the base body 1, due to the selected direction of winding of the spring 22, which is so arranged that the windings will not be self-tightening about the respective surfaces 24, 25. This, then, also retains the automatic retightening or continued tightening effect of the jaw chuck. Relative rotation of the coaxial sleeve 18 and the parts which are connected to rotate therewith in opposite direction, however, that is in the direction of loosening, is prevented by frictional engagement of the spring 22 which will tighten itself. Thus, undesired loosening of a clamped tool, for example due to vibration or abrupt stopping of the spindle 4 is reliably prevented.

In order to manually release a tool within the jaws 9, the operating ring 23 (FIG. 3) is rotated in the opposite direction, that is, in the direction towards OPEN. This shifts the spring 22 with its shoulder 30 counter the direction of winding of the spring 22 and, simultaneously, presses the spring radially inwardly. The clamping effect of the spring 22 is thus released, which, then, permits relative rotation, as well known in surrounding spring couplings. The coaxial sleeve 18, and with it the holding sleeve 19, and the outer or closing sleeve 14 can then be rotated in opening or tool releasing direction with respect to the base body 1, until a tool clamped in the jaws 9 is free and can be removed.

The spring 22, in the example selected, is located between the flange 17 of the base body 1 and the extension 16 of the holding sleeve 13. Various changes and modifications may be made, and, for example, the spring 22 can be directly cooperating with a suitable surface on the coaxial sleeve 18 or with another surface which is coupled to rotate with the holding sleeve 13 or the coaxial sleeve 18. The arrangement, further, can be so made that the spring 22 does not directly surround a region of the base body 1, in the example shown the flange 17 but, rather, a separate element which is coupled to the base body 1.

The operating ring 23 is preferably formed at its outer surface, at least in part, with a knurled or ribbed surface 32, for easy hand-gripping. The coaxial sleeve 18 has an axial extension 125 (FIG. 4) which is rotatable within the tool holder 4 which contributes to axial accuracy and guidance of the chuck.

The chuck can be installed in a machine tool or example projecting from an end wall W thereof, shown only schematically in FIG. 1.

Various other changes and modifications may be made within the scope of the inventive concept.

I claim:

1. Self-clamping or self-tightening chuck having
    an at least partly cylindrical base body (1);
    a back-up spindle means (8, 11) coaxially secured to the base body;
    a plurality of clamping or holding jaws (9) abutting against the terminal end of the spindle means and coupled thereto for rotational movement therewith;
    a holding sleeve means (13, 14, 18) surrounding said jaws, and retaining said jaws in position, including a rotation-symmetrical coaxial sleeve (18) extending over said base body (1);
    said holding sleeve means being rotatably positioned on the base body; and
    selectively engageable coupling means (22) located between said holding sleeve means (13, 14, 18) and said base body (1) which, upon relative rotation in the first direction of the holding sleeve means and the base body, release engagement between the holding sleeve means and the base body and, further, upon selective relative rotation in an opposite or second direction, engages and couples the holding sleeve means to the base body to thereby provide for tightening of the jaws about a tool held in the chuck,
    wherein, in accordance with the invention,
    said coupling means (22) comprises
    a surrounding spring clutch or coupling including a spiral spring (22) coaxially located about the base body;
    a first rotation-symmetrical zone (24) being located on the base body (1);
    a second rotation-symmetrical zone (25) being located on the holding sleeve means (13, 14, 18) and positioned axially adjacent said first zone (24);
    said spiral spring (22) spanning both said first and second zones (24, 25) for selectively connecting or disconnecting said base body and said holding sleeve means; and
    selectively operable coupling control means (23, 28) operatively associated with the spiral spring (22) for controlling release of coupling engagement of said spiral spring with both said zones.

2. The chuck of claim 1, wherein the spiral spring (22) is located interiorly of said rotation-symmetrical sleeve (18).

3. The chuck of claim 1, wherein the holding sleeve means (13, 14, 18) comprises a holding sleeve element (13) and having a portion thereof defining said second rotation-symmetrical zone (25).

4. The chuck of claim 3, wherein said portion defining said rotation-symmetrical zone comprises an axial extension of said holding sleeve element.

5. The chuck of claim 1, wherein said rotation-symmetrical zones (24, 25) are cylindrical zones.

6. The chuck of claim 1, wherein the coupling control means (23, 28) comprises an operating ring, rotatable with respect to said holding sleeve means, and engageable with a portion (27) of said spiral spring.

7. The chuck of claim 6, wherein the spiral spring (22) is located interiorly of said rotation-symmetrical sleeve (18);
    and wherein said operating ring (23, 28) is positioned axially above said coaxial sleeve (18).

8. The chuck of claim 7, wherein said operating ring (23) is rotatably positioned on said coaxial sleeve.

9. The chuck of claim 6, wherein said portion (27) of the operating ring (23) engageable with the spring (22) is located at an inner region of the ring and includes means (28) coupled to the spring to position the spring in releasing position upon rotation of said ring in a predetermined direction.

10. The chuck of claim 9, wherein said means coupled to the spring (22) comprises a cam track (28) formed at the inside of said ring.

11. The chuck of claim 9, wherein said coaxial sleeve (18) is formed with an opening (26) therein, and said portion (27) of the spring (22) extends, at least in part, through said opening (26) to permit engagement with said operating ring.

12. The chuck of claim 11, wherein the terminal region of said portion (27) of the spring (22) is bent in the direction of the inner surface of said ring (23).

13. The chuck of claim 6, further including stop means (27, 30) engageable upon rotation of the operating ring (23) and limiting rotary movement of said operating ring at least in one direction of rotation thereof.

* * * * *